(No Model.)
R. E. SIMRIL.
CORN PLANTER AND GUANO DISTRIBUTER.
No. 332,955. Patented Dec. 22, 1885.
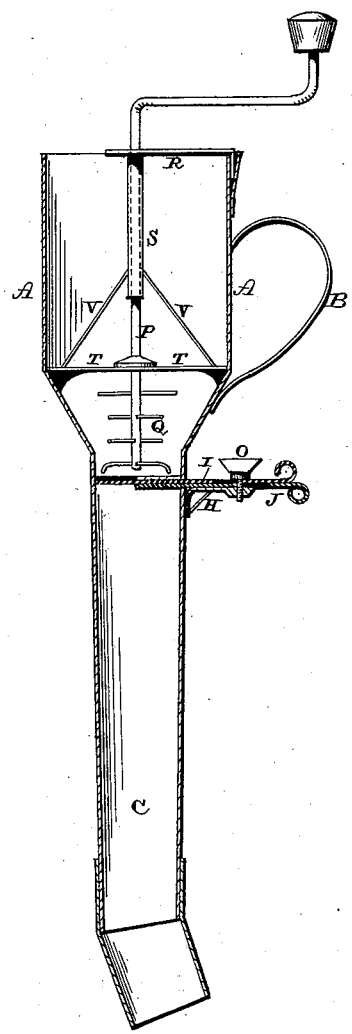

UNITED STATES PATENT OFFICE.

ROBERT EATON SIMRIL, OF NEWNAN, GEORGIA.

CORN-PLANTER AND GUANO-DISTRIBUTER.

SPECIFICATION forming part of Letters Patent No. 332,955, dated December 22, 1885.

Application filed July 18, 1885. Serial No. 171,955. (No model.)

*To all whom it may concern:*

Be it known that I, ROBERT E. SIMRIL, of Newnan, in the county of Coweta and State of Georgia, have invented certain new and useful Improvements in Corn-Planters and Guano-Distributers; and I do hereby declare the following to be a full, clear, and exact description of the invention, such as will enable others skilled in the art to which it pertains to make and use it, reference being had to the accompanying drawing, which forms part of this specification.

My invention relates to an improvement in hand corn-planters; and it consists in the combination of the two movable supports which are attached to the cylindrical body or frame, a tube which is attached to one of the supports, and a revolving shaft provided with stirring devices which pass down through the supports and the tube for the purpose of keeping the grain in the body from clogging.

The accompanying drawing represents a vertical section of a corn-planter embodying my invention.

A represents a suitable cylindrical body, which is made tapering at its lower end, and which is suspended in front of the operator by means of a strap which passes around the neck and shoulder. Upon one side of this body is formed a suitable handle, B, by means of which the operator is enabled to guide the lower end of the delivery-tube C to any desired point. The lower end of this delivery-tube is bent or turned at an angle, as shown, so as to deliver the grain or guano more accurately in position than can be done where the tube is made entirely straight. Passing through the upper end of the delivery-tube, near the bottom of the conical portion of the cylinder, are two slides, I J, both of which are supported in position upon the support H, and held in any desired place by means of the set-screw O. One of these slides is intended to regulate the amount of feed, while the other is intended to be used as a cut-off to stop the feed at any time it may be so desired.

In order to prevent the guano or seed in the cylinder from becoming clogged, a suitable shaft, P, is passed down through the center of the cylinder, and on the lower end of this shaft are formed suitable stirring devices, Q. This shaft is supported in position by means of the support R, which is secured to the top of the vertical guiding-tube S and by the support T, which is secured to the lower end of the support by means of the braces V. The upper support catches in a pocket which is formed especially to receive it, while the lower one is just long enough to fit upon the upper part of the conical portion of the cylinder. When it is desired to remove the stirrer and its supports, it is only necessary to pull upward upon them, when the whole interior of the cylinder will be left perfectly clear.

This planter is intended for planting various kinds of seeds, and to distribute guano or fertilizers of different kinds in the hills where the seeds have been dropped.

Having thus described my invention, I claim—

The combination of the body A, the support R, which is applied to its outer edge, the shaft P, provided with the stirring devices Q, the tube S, braces V, and support T, whereby the whole stirring apparatus is made removable from the body, substantially as described.

In testimony whereof I affix my signature in presence of two witnesses.

ROBERT EATON SIMRIL.

Witnesses:
J. J. GOODRUM,
DANIEL SWINT.